United States Patent [19]
Kondo et al.

[11] Patent Number: 6,088,725
[45] Date of Patent: Jul. 11, 2000

[54] MOBILE COMPUTER SUPPORTING SYSTEM, ITS ADMINISTRATIVE SERVER, ITS TERMINAL, AND ADDRESS CONVERSION METHOD

[75] Inventors: Takeshi Kondo, Fujisawa; Yukio Nakata, Machida; Daiji Hitaka, Yokohama, all of Japan

[73] Assignee: Hitachi, Ltd., Tokyo, Japan

[21] Appl. No.: 08/905,085

[22] Filed: Aug. 1, 1997

[30] Foreign Application Priority Data

Aug. 2, 1996 [JP] Japan .................................. 8-204720

[51] Int. Cl.[7] ...................... G06F 15/177; G06F 15/173; G06F 15/16
[52] U.S. Cl. .......................... 709/220; 709/221; 709/238; 709/245; 709/230
[58] Field of Search .................................. 709/223, 220, 709/221, 222, 238, 245, 230; 455/433, 435; 370/329, 402, 349

[56] References Cited

U.S. PATENT DOCUMENTS

| | | | |
|---|---|---|---|
| 5,519,706 | 5/1996 | Bantz et al. .............................. | 455/435 |
| 5,548,586 | 8/1996 | Kito et al. ................................ | 370/349 |
| 5,572,528 | 11/1996 | Shuen ....................................... | 370/402 |
| 5,590,126 | 12/1996 | Mishra et al. ........................... | 370/329 |
| 5,619,552 | 4/1997 | Karppanen et al. ..................... | 455/433 |
| 5,845,079 | 12/1998 | Wada et al. .............................. | 709/223 |

FOREIGN PATENT DOCUMENTS 5-276757  11/1993  Japan.
6-250135   9/1994  Japan.

OTHER PUBLICATIONS

Dynamic Updates in the Domain Name System (DNS Update), Vixen, et al. pp. 1–26, Apr. 1997.

VIP: A Protocol Providing Host Migration Transparency, Computer Software, vol. 10, No. 4, pp. 22–38, Jul. 1993.

*Primary Examiner*—Le Hien Luu
*Attorney, Agent, or Firm*—Beall Law Offices

[57] ABSTRACT

A mobile computer supporting system realizes communication even when a communication protocol address is to be dynamically changed due to movement of the computer, or the like. When a PC has moved, it notifies an AMS of a changed present address together with its home address. The AMS stores the home address and present address of each terminal, so as to correspond to each other, into an address correspondence table. When a PC sends and receives information to and from the PC, a socket hook processing of the PC acquires the information when the home address of the PC is added to the information. The socket hook processing inquires of the AMS of the present address of the PC using the home address of the PC, converts the home address of the PC added with the information to the present address obtained by the inquiry, and sends the information after conversion to a socket processing.

8 Claims, 9 Drawing Sheets

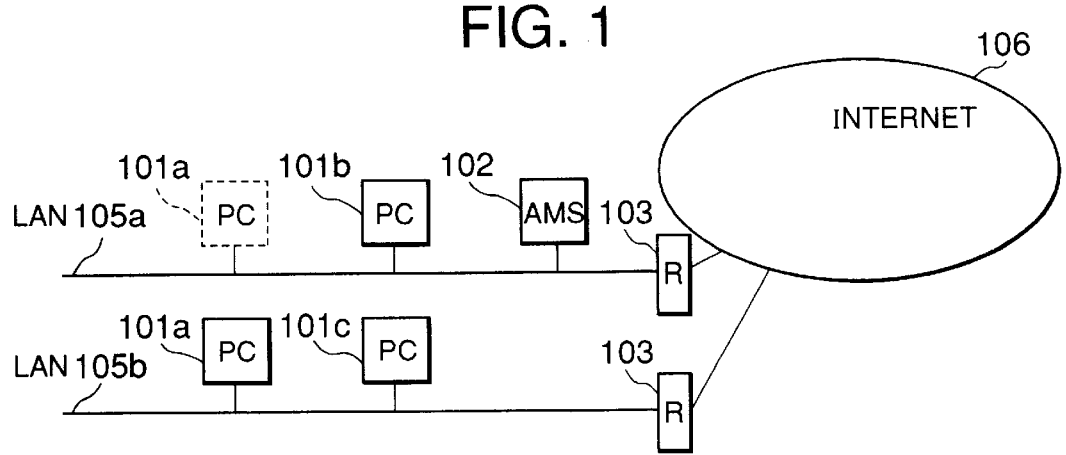
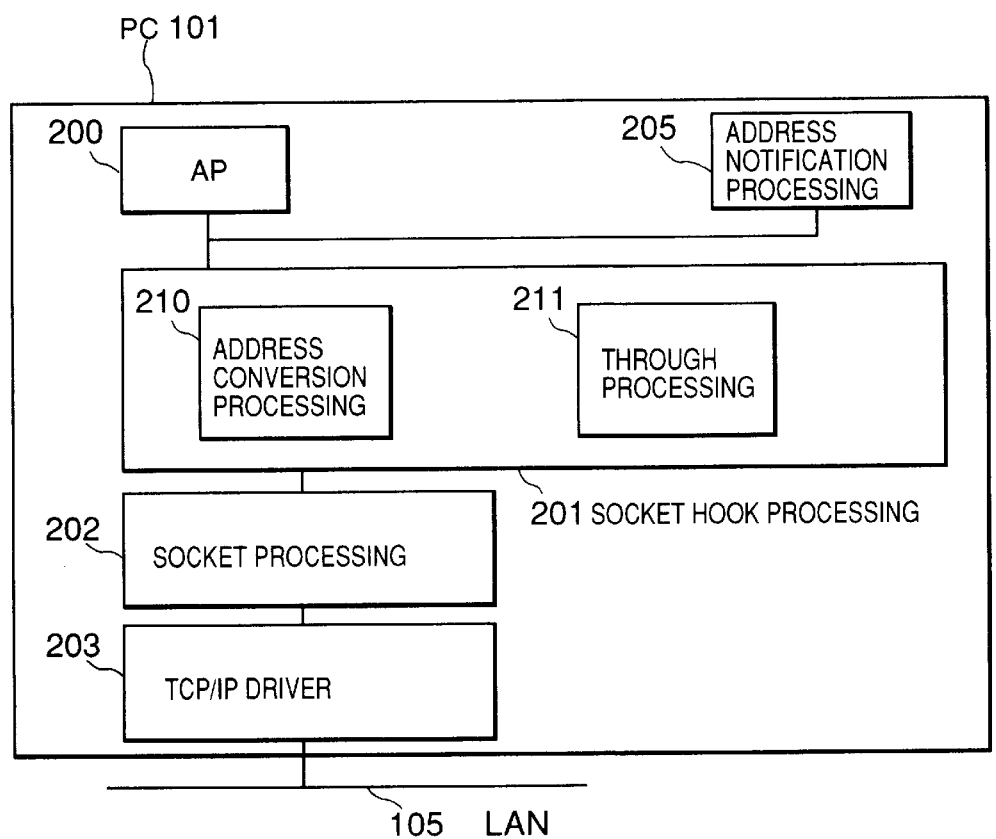

| ACCESS RIGHT ADMINISTRATION TABLE | |
|---|---|
| MOBILE TERMINAL ADDRESS | NOTIFICATION-ALLOWED ADDRESS |
| PC101a | PC101b |
| | PC101c |
| | PC101d |
| | PC101e |

1010

MOBILE COMPUTER SUPPORTING SYSTEM, ITS ADMINISTRATIVE SERVER, ITS TERMINAL, AND ADDRESS CONVERSION METHOD

BACKGROUND OF THE INVENTION

1. Field of the Invention

The present invention relates to a computer network system in which communication is realized by using a communication protocol address assigned to a computer and decided in accordance with its connecting location on a network. In particular, according to the present invention, even when the communication protocol address is to be changed dynamically due to movement of a computer, etc., communication is possible without variously affecting existing application programs from that change in the communication protocol address.

2. Related Art

Conventionally, in the network system of the Internet, there is used a domain name system (hereinafter, abbreviated to "DNS") which provides a communication protocol address (IP address) of a computer in accordance with an inquiry based on a name (domain name) uniquely assigned to that computer. In the DNS, names of computers and their communication protocol addresses are registered in a database in advance so that a communication protocol address can be searched for from a name of a computer.

In the environment of the network system using the DNS, when a communication protocol address assigned to a computer should be changed in accordance with a change of a connecting location of that computer due to movement of that computer, etc., the communication protocol address searched for using the name of the computer registered in the search database of the DNS is changed in that database. After the revision of the database, the changed communication protocol address of that computer to communicate with can be obtained using the name of the computer. Accordingly, in an application program (hereinafter, briefly referred to as "AP"), communication is possible even if a communication protocol address of a communication partner's computer is changed.

Conventionally, the search database of the DNS has been revised manually using a database editing program. Recently, the IETF (Internet Engineering Task Force), a group for standardization on the Internet, has promoted standardization work for a dynamic DNS (hereinafter, referred to as "DDNS") protocol, by which a search database of DNS can be revised on-line, dynamically. This DDNS includes a DDNS server computer, which has a search database and a function for allowing access to the search database from a client terminal. Accordingly, a user can access the search database of the DDNS server computer to change a communication protocol address.

Further, the above-described IETF work group has proposed a method in which, when a computer is moved and connected with another network, a server, etc. of the DHCP (Dynamic Host Configuration Protocol) assigns a new address to the moved host computer, and another host computer's communication with this host computer assigned with a new address is supported by mounting the VIP (Virtual Internet Protocol) on a router device or the host computers.

Another example of the system for communication of a mobile computer is described in Japanese Patent Application Laid-Open (KOKAI) No. 7-170286. This conventional technique realizes a function of supporting communication with a host computer assigned with a new address, in a network system including a mobility supporting border router (MSBR), and a mobility supporting router (MSR).

As a similar and known example, Japanese Patent Application Laid-Open (KOKAI) No. 7-129488 describes a mobile terminal administration device. In this conventional technique, communication with a mobile computer is supported by a home location administration device, a visitor location administration device, and a private location administration device.

Thus-described conventional techniques have the following problems.

In the above-described DDNS, an application program provided in a computer must have a logic for making a search of a communication protocol address, using a name of a computer of a communication partner. In another words, when an AP is not a software adapted for the DDNS, it cannot utilize the DDNS.

Further, in the mobile computer described in the above-described 7-170286 and 7-129488, an operating system of the computer must be remade, and a network transit device such as an existing router must be changed.

SUMMARY OF THE INVENTION

Thus, an object of the present invention is to make communication possible when a communication protocol address should be changed dynamically due to, for example, movement of a computer, in a mobile computer supporting system, without changing a network transit device such as an existing router, and without exerting various influences of change in the communication protocol address upon existing application programs.

Another object of the invention is to make communication possible by effectively utilizing existing equipment, when a communication protocol address should be changed dynamically due to, for example, movement of a computer, in a mobile computer supporting system.

To accomplish thus-described objects, a mobile computer supporting system according to the present invention comprises:

a first terminal which belongs to a first network as its home network;

a second terminal which belongs to a second network as its home network; and an administration server provided with a storing means for storing a home address and a present address in a correspondence relation, for each terminal, the home address being assigned when the terminal is connected to the home network and the present address being assigned when the terminal is connected to another network different from the home network;

the first terminal comprising:
  notification means for notifying the administration server of the present address together with the home address of the first terminal, when the present address is assigned to the first terminal;

the second terminal comprising:
  a protocol processing means for performing processing in accordance with a predetermined protocol when sending and receiving information to and from the second network;
  an application program for sending and receiving information to and from the first terminal through the protocol processing means;

an acquiring means for acquiring information if the home address of the first terminal is added to the information, when the application program sends the information to the protocol processing means so that the information is sent to the first terminal through the protocol processing means;

an inquiry means for inquiring the administration server about the present address of the first terminal by using the home address of the first terminal, added to the acquired information acquired by the acquiring means, and for receiving a response on the present address of the first terminal from the administration server; and a conversion means for converting the home address of the first terminal, added to the acquired information acquired by the acquiring means, to the present address of the first terminal, received by the inquiry means;

the acquiring means sending the acquired information, having the present address converted from the home address by the conversion means, to the protocol processing means; and the administration server comprising:

a registration means for registering the present address in a present address storing area of the storing means corresponding to the home address of the first terminal, when notified of the present address by the notification means; and a response means for sending the present address of the first terminal, which is stored in the storing means and corresponds to the home address of the first terminal, for responding to the inquiry means, when inquired by the inquiry means about the present address of the first terminal.

The notification means of the first terminal notifies the administration server of the present address together with the home address of the first terminal, when the present address is assigned to the first terminal.

The registration means of the administration server registers the present address in a present address storing area of the storing means corresponding to the home address of the first terminal, when notified of the present address by the notification means. By this, the administration server always has the newest present addresses.

The acquiring means of the second terminal acquires information if the home address of the first terminal is added to the information, when the application program sends the information to the first terminal through the protocol processing means. And, the inquiry means inquires of the administration server about the present address of the first terminal by using the home address of the first terminal, added to the acquired information acquired by the acquiring means, and receives a response on the present address of the first terminal from the administration server. By this response from the administration server, the present address of the moved terminal can be known.

The conversion means converts the home address of the first terminal, added to the acquired information acquired by the acquiring means, to the present address of the first terminal, received by the inquiry means. By this conversion, it is possible to communicate with a terminal having a different address due to change of a network to which it is connected, as a result of movement of the terminal.

After the conversion, the acquiring means sends the acquired information, having the present address converted from the home address by the conversion means, to the protocol processing means. And the protocol processing means performs processing in accordance with a predetermined protocol when sending and receiving information to and from the second network.

Thus, according to the present invention, by providing an acquiring means (socket hook processing), information issued from an existing application program is acquired, and a home address included in the information is converted to a present address. Accordingly, existing programs can be employed without change.

According to the present invention, in a mobile computer supporting system, communication can be realized when a communication protocol address should be dynamically changed due to movement of the computer, or the like, without changing the existing network transit device such as a router, and without having various influences on the existing application programs due to changes in the communication protocol address. Accordingly, the present invention can be generally applied for a computer network system in which data communication is performed using the communication protocol.

BRIEF DESCRIPTION OF THE DRAWINGS

FIG. 1 is a schematic diagram showing a network system according to a first embodiment of the present invention;

FIG. 2 is a view showing a configuration of a software module in a personal computer (PC);

DETAILED DESCRIPTION OF THE PREFERRED EMBODIMENTS

Figure 3:
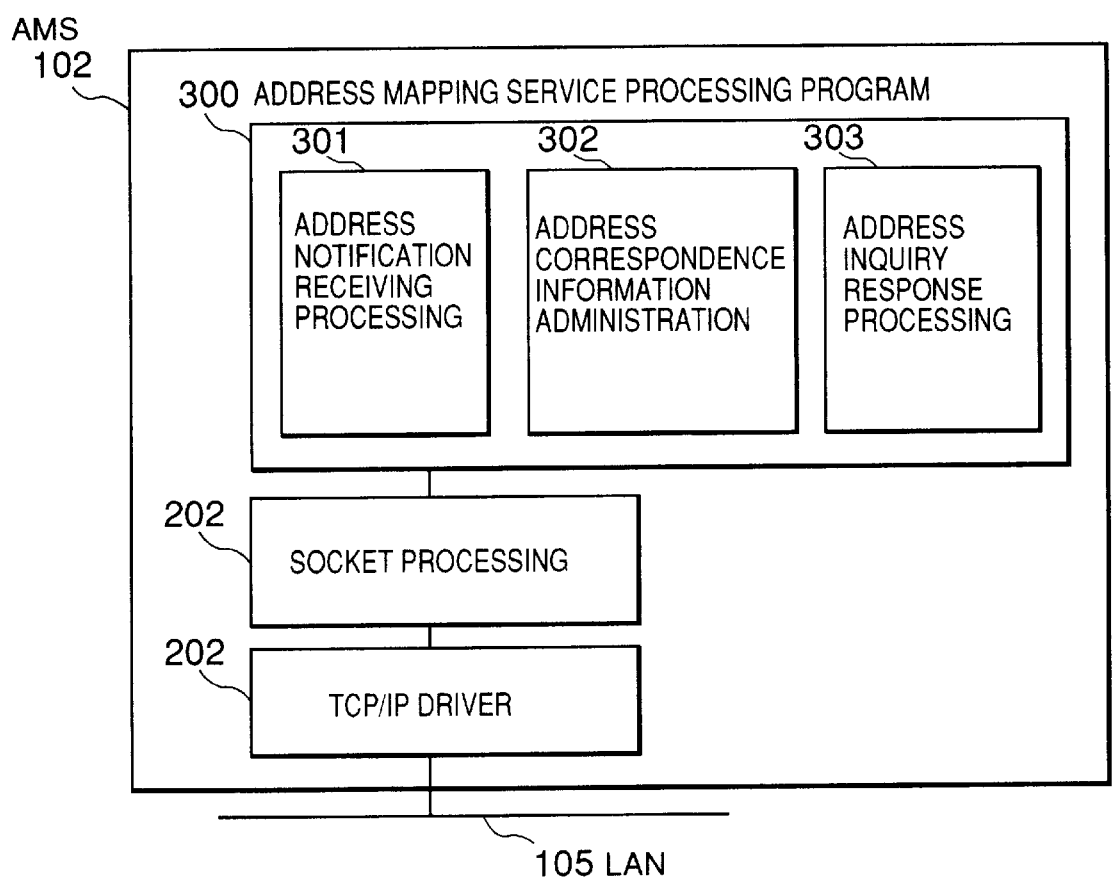
FIG. 3 is a view showing a configuration of a software module in an address mapping server (AMS) 102.

Now, embodiments of the present invention will be described in detail referring to the drawings.

FIG. 1 is a schematic diagram showing a network system according to an embodiment of the invention. In FIG. 1, the reference numerals 105*a* and 105*b* show separate local area networks (hereinafter, referred to as LANs). Onto LANs 105*a* and 105*b*, there are connected one or more personal computers (hereinafter, referred to as PCs) 101 as terminal units, and an address mapping server (hereinafter, referred to as "AMS") 102. The AMS 102 has a function of managing correspondence relations between (a) an Internet protocol address (IP address) which has been first and uniquely assigned to each PC and is an address (hereinafter, referred to as a "home address") used generally in the embodiments of the present invention, and (b) an address (hereinafter, referred to as a "present address") which is an IP address decided and assigned depending on a connection location on a network and is changed when a connection location on a network is changed. This AMS 102 will be described in more detail later. The reference numeral 103 refers to a router device, and each of the LANs 105a and 105 is connected with the Internet 106 through this router device 103 and using the TCP/IP communication protocol. In this network system, PCs 101a, 101b and 101c can communicate with another PC 101 on the LAN to which it is connected or on another LAN.

To communicate with another PC 101, each of PCs 101a, 101b and 101c designates an IP address of the PC 101 of the communication partner. An IP address consists of a network identifier and a host identifier. On the Internet, there flow data packets, each of which comprises communication data and an IP address added therewith. The router 103 performs routing control to decide to which network a data packet is to be relayed, depending on a network identifier in the data packet. The LAN 105a and LAN 105b are different networks separated by the routers 103. Accordingly, network identifiers assigned to the LANs 105a and 105b are different from each other. In the embodiments of the present invention, to communicate with another PC 101, an application program in a PC 101 designates a home address of the communication partner's PC 101 as its IP address, and a socket hook processing, which will be described in detail below, converts the home address to a present address for sending to a network. Therefore, a router 103 can control routing, by means of a present address.

Next, as an example, there will be described a case that, in FIG. 1, the PC 101a moves from the LAN 105a to the LAN 105b. An IP address of the PC 101a at the time of its connection with the LAN 105b after the movement is necessarily different from its IP address at the time of its connection with the LAN 105a, because the network identifiers are different. For example, it is assumed that, in FIG. 1, the home address of the PC 101a is its IP address at the time of its connection with the LAN 105a, and its present address is its IP address at the time of its connection with the LAN 105b after the movement.

First, referring to FIG. 2, the software configuration in the PC 101 will be described. In FIG. 2, the software (programs) executed in each of the PCs 101a, 101b and 101c is classified in accordance with the configuration of communication layers. In FIG. 2, the reference numeral 200 shows an application program (AP). The AP 200 is a network communication program for various processings, i.e., file transfer, TELNET, network chat, or the like. Usually, these APs 200 operate on an operating system (OS). This OS includes a communication processing module which controls data communication on a network by processing communication protocols. Each of PCs 101a, 101b and 101c includes a TCP/IP driver 203 as a communication processing module, APs 200, and a socket processing 202 which performs interface processing between APs 200 and the TCP/IP driver 203. In the conventional installing of software, APs 200 directly call the socket processing 202.

In the embodiments of the present invention, between the socket processing 202 and the APs 200, a socket hook processing 201 is installed as a middleware software in a PC 101. Further, there will be installed, at the same time, an address notification processing 205 as an auxiliary application, which, when a present address is changed due to movement of the PC 101, notifies the AMS 102 of a present address after the movement.

In that case, a filename of the socket hook processing 201 is registered as a file name of the socket processing 202 in advance, although, conventionally the socket processing 202 is called by designating the file name of the socket processing 202 at the time of execution of an AP 200. By this, at the time of executing the AP 200, not the socket processing 202 but the socket hook processing 201 is called by designating the file name of the socket processing 202. A file name different from the original one given to the socket hook processing 201 is registered as a new file name for the socket processing. At the time of execution of the socket hook processing 201, the new file name of the socket processing 202 is designated to call the socket processing 202. Thus, an AP 200 can be used without being changed from the conventional one.

Similarly to an AP 200, the address notification processing 205 interfaces with the socket hook processing 201. The contents of the socket hook processing 201 and the address notification processing 205 will be described later. An interface given to an AP 200 by the socket hook processing 201 is the same as the one given to an AP 200 by the socket processing 202. Further, the socket hook processing 201 also has an interface with the socket processing 202. This interface is the same one provided to an AP 200 by the socket processing 202. Accordingly, the socket hook processing 201 provides a socket interface to an AP 200 utilizing the interface with the socket processing 202 so as to pretend that the socket processing 202 sends and receives information with the AP 200, while the socket hook processing 201 acquires information sent and received between the AP 200 and the socket processing 202 to perform the conversion of a present address if needed.

The socket hook processing 201 includes an address conversion processing 210 for converting a present address and a through processing 211 for passing commands sent and received between the AP 200 and the socket processing 202 as they are. For passing commands as they are, the AP 200 is provided with a function having the same arguments and command name as a corresponding socket interface function. As to the processing of the function, it does nothing except for calling the corresponding interface function of the socket processing 202. On the other hand, in the address conversion processing 210, a part for providing the same function as the corresponding interface function to the AP 200 is the same as the through processing 211, while, as the processing of that function, it performs processing such as address conversion before calling the corresponding socket interface function provided by the socket processing 202 as in the through processing 211. Namely, the address conversion processing 210 differs from the through processing 211 in its address conversion processing. Which of the address conversion processing 210 and the through processing 211 is to be used is judged from a received command of the socket interface functions. Commands including an IP address, such as a "connect" call for requesting connection, are prescribed in advance as the commands of the socket interface functions to be processed in the address conversion processing 210. When a prescribed command of the socket interface functions is acquired in the socket hook processing 201, processing is performed in the address conversion processing 210. On the other hand, when a non-prescribed command of the socket interface function is acquired in the socket hook processing 201, processing is performed in the through processing 211.

Next, referring to FIG. 3, a configuration of the AMS 102 will be described. FIG. 3 shows a configuration of software modules of the AMS 102. The AMS 102 is an administrative server which administers home addresses and present addresses so as to correspond to each other, and notifies each PC 101 of a present address in reply to a request from that PC 101. The AMS 102 can be realized by similar hardware as a PC 101, and therefore, here, their difference will be described from the viewpoint of software. A socket processing 202 and a TCP/IP driver 203 shown in FIG. 3 have similar software configuration as ones described in the software configuration of the PC 101 shown in FIG. 2. The greatest difference from the PC 101 lies in an address mapping service processing program 300 installed as an AP of the AMS 102. This address mapping service processing program 300 is the core of the AMS 102. The address mapping service processing program 300 relates home addresses to their respective present addresses and administers correspondence information, and notifies a PC 101 of a present address corresponding to a home address in reply to a request of that PC. The address mapping service processing program 300 also includes an address notification receiving processing 301, an address correspondence information administration 302, and an address inquiry response processing 303. The address correspondence information administration 302 has an address correspondence table which stores home addresses and present addresses so as to correspond to each other. When an address notification processing 205 of a PC 101 notifies the AMS 102 of a changed present address, the address notification receiving processing 301 receives the notification and renews the present address corresponding to the home address of this PC 101 into the present address after the change. When the address inquiry response processing 303 receives an inquiry of the newest present address of a PC 101 from an address inquiry processing, which will be described later, of an address conversion processing of another PC 101, the address inquiry response processing 303 sends a present address corresponding to the home address of the former PC 101 from the address correspondence table. Details of these processings will be described later.

Figure 4:
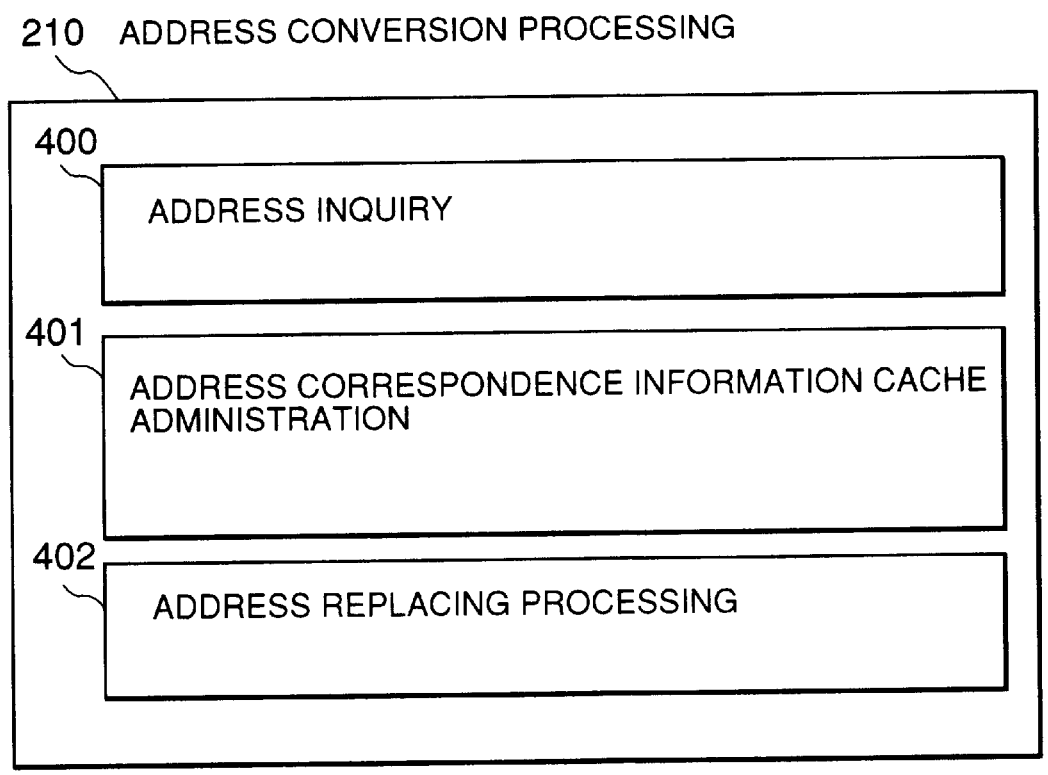
FIG. 4 is a functional block diagram of an address conversion processing module.

Next, referring to FIG. 4, the address conversion processing 210 in a PC 101 will be described. FIG. 4 shows a construction of the address conversion processing 210 in a PC 101. The address conversion processing 210 includes three functions, i.e., an address inquiry processing 400, an address correspondence information cache administration 401, and an address replacing processing 402. The address correspondence information cache administration 401 has an address correspondence table which stores correspondence relations between home addresses and the newest present addresses, and maintains the home addresses and the newest present addresses as cache information. Further, the address correspondence information cache administration 401 also performs clearing of contents of the cache when the predetermined time has elapsed. The address inquiry processing 400 acquires a request of the AP 200, extracts a home address of a communication partner described in the request, and inquires of the above-described AMS 102 about a present address corresponding to the extracted home address when the present address corresponding to that home address is not held in the address correspondence table of the address correspondence information cache administration 401. The address replacing processing 402 replaces the above-described home address included in the request of the AP 200 by a present address, referring to the cache information of the address correspondence table of the above-described address correspondence information cache administration 401.

Figure 5:
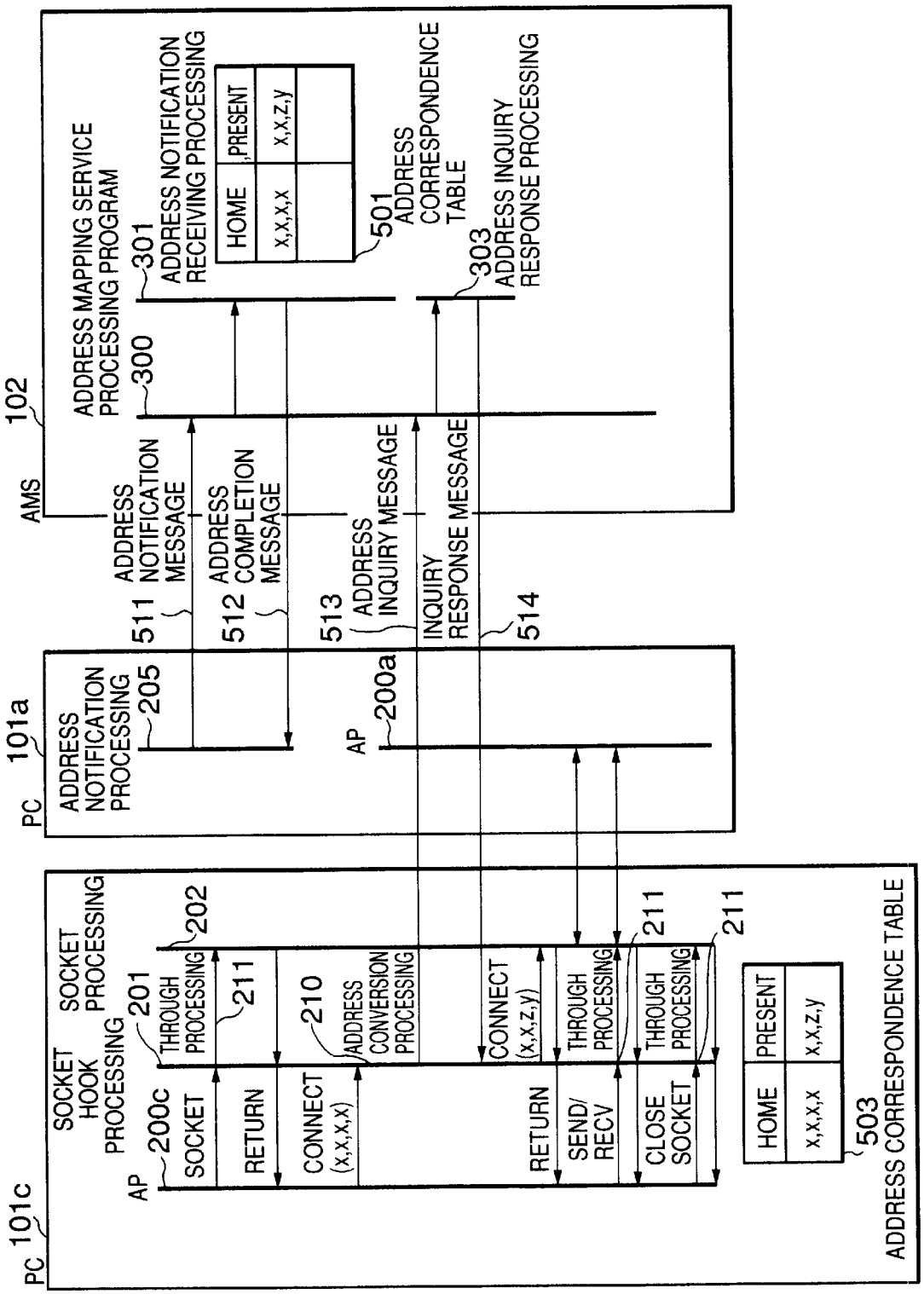
FIG. 5 is a sequence diagram showing processing in service in the connection mode, according to the invention.

Next, referring to FIG. 5 showing the sequence of data communication between the PC 101*c* and PC 101*a* in the connection mode, processing logic of each module in the PC 101 and AMS 102 shown in FIG. 1 will be described in detail. FIG. 5 shows, in detail, the processing sequence of data communication in the connection mode. The sequence diagram of FIG. 5 shows the case that the PC 101*a* which has been connected to the LAN 105*a* shown in FIG. 1 moves onto the LAN 105*b*, and thereafter, the PC 101*c* communicates with the moved PC 101*a* in the connection mode. FIG. 5 also shows an address correspondence table 501 of the AMS 102 and an address correspondence table 503 of the PC 101*c*, both tables storing home addresses and present addresses so as to correspond to each other.

Figure 6:
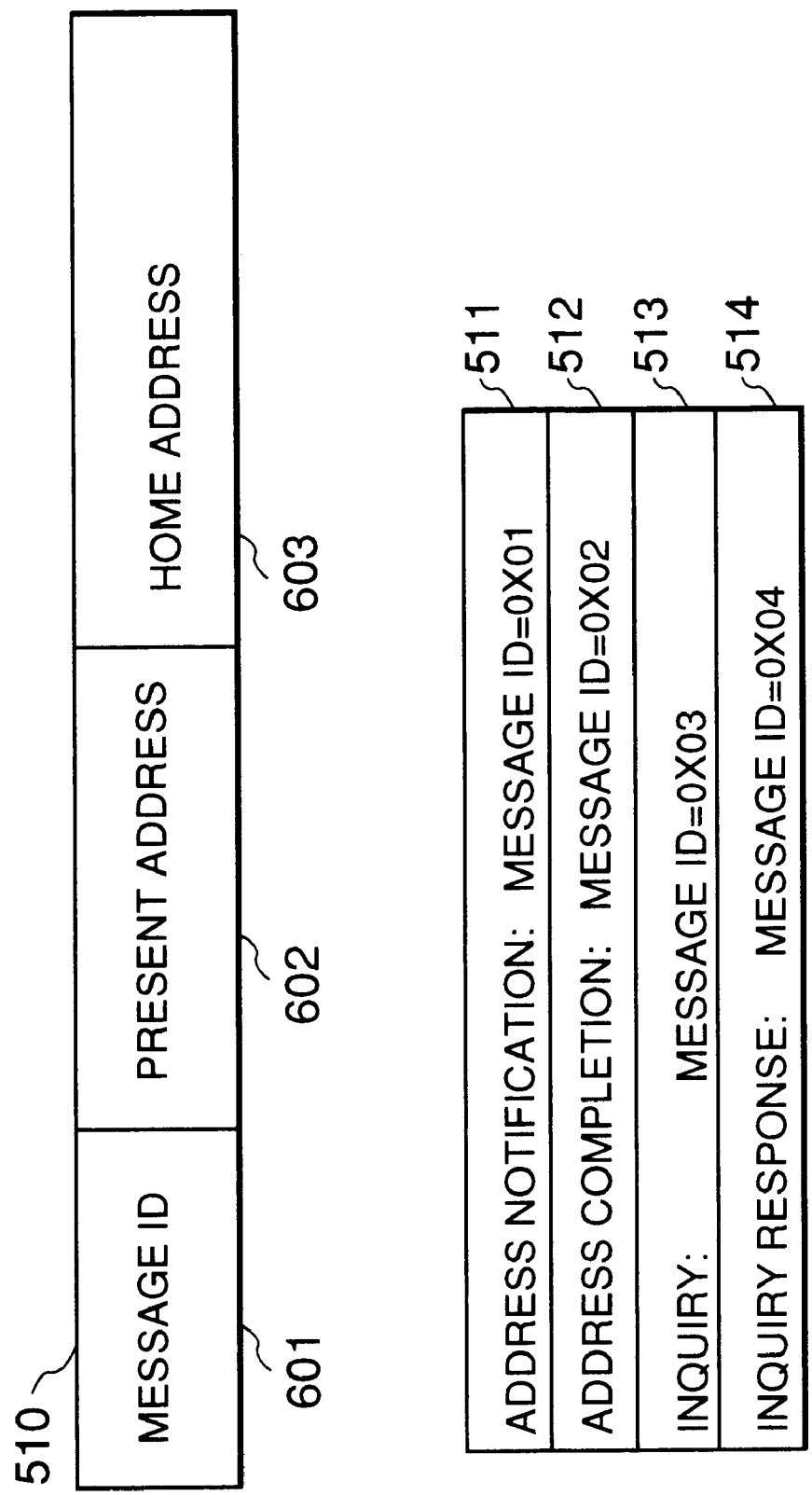
FIG. 6 is an explanatory view showing a protocol message format in an embodiment of the invention.

FIG. 6 shows a detailed format of messages to be described in relation to FIG. 5.

The message format of FIG. 6 will be described before the sequence of FIG. 5. In FIG. 6, a reference numeral 510 refers to a general format for a message, which includes a message ID field 601, a present address field 602, and a home address field 603, with a destination address and source address of the message being added separately.

The present address field 602 and the home address field 603 are both of fixed length. Depending on a value of the message ID field 601, various types of messages can be identified. There are four message types: an address notification message 511 for a PC 101 to notify the AMS 102 of a new present address; an address completion message 512 to notify a PC 101 of registration of a new present address by the AMS 102 in the address correspondence table 501; an address inquiry message 513 for the address conversion processing 210 of the socket hook processing 201 shown in FIG. 2 to inquire of the address notification receiving processing 301 of the AMS 102 shown in FIG. 3 about a present address; and an inquiry response message 514 for the address inquiry response processing 303 shown in FIG. 3 to notify the address conversion processing 210 shown in FIG. 2 of a present address. In the address notification message 511, the address notification processing 205 of a PC 101 shown in FIG. 2 sets values of a present address and home address into the present address field 602 and the home address field 603, respectively. This address notification message 511 is made and sent by the address notification processing 205 of a PC 101 shown in FIG. 2, and received by the address mapping service processing 300 of the AMS 102 shown in FIG. 3. In the address completion message 512, when the address notification receiving processing 301 shown in FIG. 3 succeeds in registration of a new present address into the address correspondence table 501, the same values as in the present address field 602 and the home address field 603 of the address notification message 511 are set into the present address field 602 and the home address field 603 of the address completion message 512, respectively. When registration into the address correspondence table 501 ends in failure, the value of the home address is simply set into the present address field 602 to indicate the failure of registration. The address completion message 512 is sent from the AMS 102 to a PC 101 as a response to the address notification message. In the address inquiry message 513, null is set as the value of the present address field 602, and a home address of a PC 101 about which inquiry is to be made is set into the home address field 603. The address inquiry message 513 is made by the address conversion processing 210 of a PC 101 and sent to the address mapping service processing 300 of the AMS 102. In the inquiry response message 514, when a home address described in the home address field 603 of the address inquiry message 513 is one registered in the address correspondence table 501, a present address corresponding to that home address is written in the present address field 602 of the inquiry response message 514. When the home address is not registered in the address correspondence table 501, that home address described in the home address field 603 of the address inquiry message 513 is set in the present address field 602 of the inquiry response message 514 to indicate no registration (with the present address not being changed because of no movement). The inquiry response message 514 is made by the address inquiry response processing 303 of the AMS 102 shown in FIG. 3, and sent to a PC 101 as a response of the address inquiry message 513.

Now, referring to FIG. 5 again, the PC 101a which has newly moved onto the LAN 105b is assigned a present address on this LAN 105b after physical connection to the network. This assignment of a present address may be made either by an administrator of the LAN 105b or automatically by a DHCP server. After the new present address is assigned in this way and when the connection between the LAN 105b and the PC 101a comes into an on-line state, a user of the PC 101a starts the address notification processing 205 and inputs the newly assigned present address described above. The address notification processing 205 makes an address notification message 511 by pairing the newly-inputted present address of the PC 101a and its home address. This address notification message 511 is sent to the address mapping service processing 300 which is under execution in the AMS 102. On receiving the address notification message 511 from the address notification processing 205, the address mapping service processing 300 checks the contents of the message, and puts it under the control of the address notification receiving processing 301 since it is the address notification message, giving information on the correspondence between the present address and the home address, i.e. the contents of the message, to the address notification receiving processing 301. The address notification receiving processing 301, now in control, registers the pair of the home address and the present address into the address correspondence table 501 shown in FIG. 5. The address correspondence table 501 is so constructed that a pair of indexes is given for a pair of a home address and a present address. A home address is stored in a storing area added with an index of the home address, and a present address is stored in a storing area added with an index of the present address. When registration into the address correspondence table 501 is finished in this way, an address completion message 512 is returned to the address notification processing 205 of the PC 101a. On receiving the address completion message 512, the address notification processing 205 finishes the processing at that point. When the registration into the address correspondence table 501 ends in failure, the address notification processing 205 receives an address completion message 512 with the present address field 602 being set simply with the value of the home address. Detecting the failure, the address notification processing 205 can send the address notification message again.

Next, as an example, there will be described a sequence in the case that, after completion of registration, a communication AP 200c of the PC 101c makes connections with a communication AP 200a of the PC 101a to be communicated with it. By way of example, it is assumed that the PC 101c is a client and the PC 101a is a server in the client-server model. The sequence will be described in serial order in the following.

First, the AP 200c of the PC 101c on the client side issues a "socket" call as a command of the socket interface function. On receiving this command, the socket hook processing 201 calls a "socket" call of the socket processing 202 by the through processing 211, and returns its return value to the AP 200c as it is.

Next, the AP 200c issues a "connect" call by designating the home address ("x.x.x.x" in the example shown in FIG. 5) of the PC 101a. The socket hook processing 201 acquires this, and converts the home address into the corresponding present address using the address conversion processing 210. In the address inquiry processing 400 of the address conversion processing 210 of the socket hook processing 201 which acquired the "connect" call, the home address of the communication partner described in the "connect" call is extracted first. When a present address corresponding to the extracted home address is not held in the address correspondence table 503 of the address correspondence information cache administration 401, an address inquiry message 513 destined for the address mapping service processing 300 of the AMS 102 is made by the address inquiry processing 400. The extracted home address is described in the home address field 603 of this address inquiry message 513. Here, it is assumed that the IP address of the AMS 102 and the port number indicating the address mapping service processing 300 are held in the PC 101c in advance, and they are added to the message as its destination.

On receiving the address inquiry message 513, the address mapping service processing 300 of the AMS 102 gives the control to the address inquiry response processing 303. The address inquiry response processing 303 searches the address correspondence table 501, and describes the present address (here, "x.x.z.y") corresponding to the home address in the present address field 602 of the inquiry response message 514 to return it to the address conversion processing 210 of the PC 101c.

On receiving the inquiry response message 514 from the address inquiry response processing 303 of the AMS 102, the address inquiry processing 400 of the address conversion processing 210 extracts the present address ("x.x.z.y") from the present address field 602 of the inquiry response message 514, and stores the extracted present address in the address correspondence table 503 of the address correspondence information cache administration 401. The address replacing processing 402 of the address conversion processing 210 issues a "connect" call to the socket processing 202 by designating the present address ("x.x.z.y") of the PC 101a held in the address correspondence table 503 of the address correspondence information cache administration 401. The socket processing 202 establishes the connection, and sends a return value for "connect" call, and the socket hook processing 201 returns that return value to the AP 200c by the through processing.

After the establishment of the connection, all processings of the socket hook processing in the AP 200 of the PC 101a are processed by the through processing 211.

By such processing, connection is established between the PC 101c and PC 101a by the processing of a "connect" call, and data transfer is possible. Thereafter, each of the APs 200 of both the PCs can perform data communication by using a "send" call and/or a "recv" call. Further, when the connection is closed by "closesocket", thereafter, the data communication is not performed. On receiving these requests, the socket hook processing 201 delivers these requests as they are to the socket processing 202 by the through processing 211.

Next, referring to FIG. 7, a processing sequence of communication in the connection-less mode will be described. In the communication in the connection-less mode, all the messages to be transferred are added with respective IP addresses. Accordingly, an IP address added to a function such as a "sendto" call, a "recvfrom" call, or the like for sending a message is changed from a home address to a present address. An inquiry about the newest present address is made at the time of sending the first message, and in the sending of the second message and thereafter, the present address is obtained by referring to the address correspondence table 503 of the address correspondence information cache administration 401.

Figure 7:
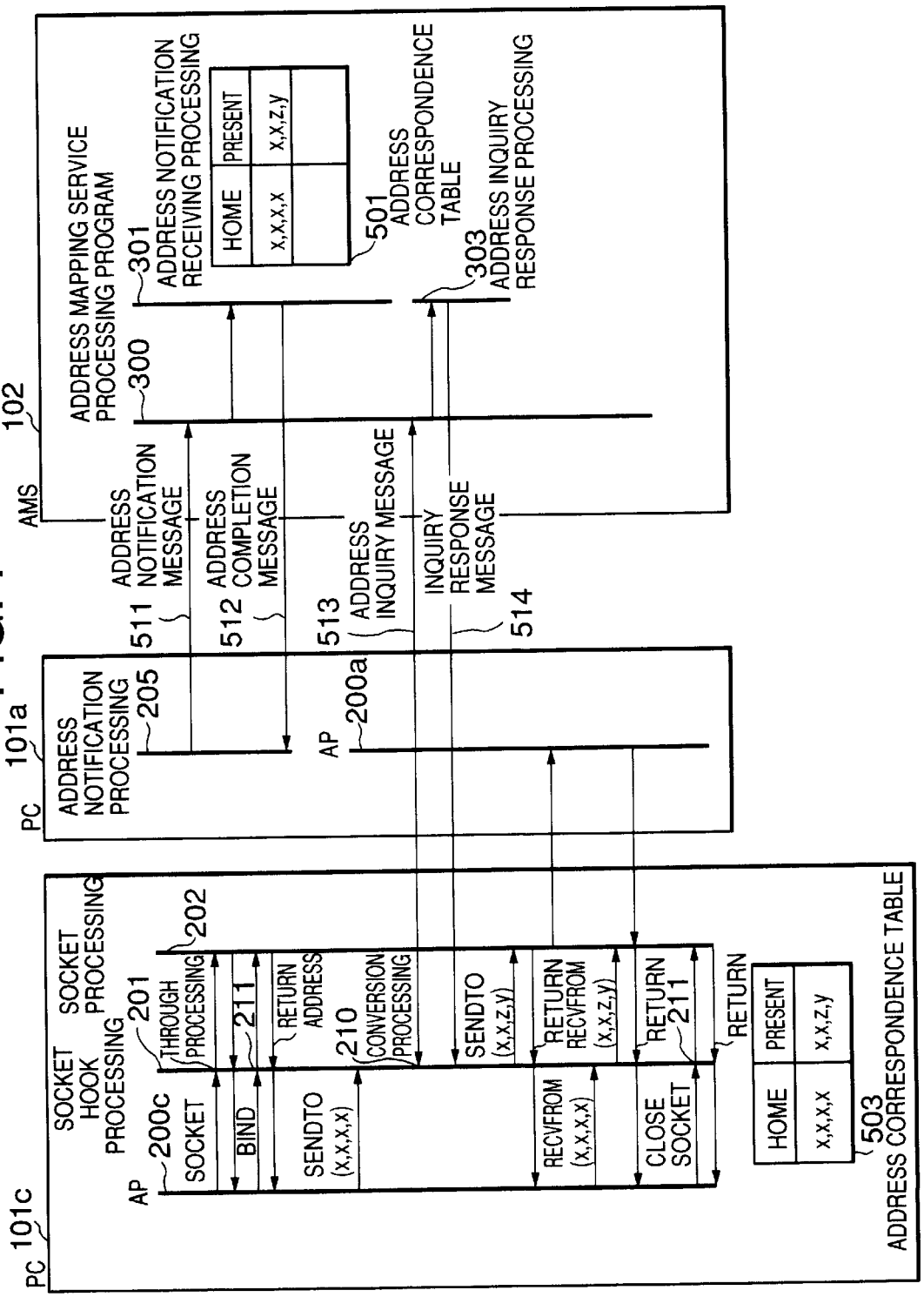
FIG. 7 is a sequence diagram of processing in service in the connection-less mode, according to the first embodiment of the invention.

In FIG. 7, the sequence for registration of a present address from the notification of the address by the PC 101a to the completion of the registration is performed similarly to the sequence shown in FIG. 5. The sequence in the PC 101c as a client is performed similarly to the sequence in the connection mode shown in FIG. 5 until the issue of a "socket" call by the AP 200c. From the issue of a "bind" call and thereafter, the following processing is performed.

In FIG. 7, when there arises a "bind" call, the through processing 211 delivers the "bind" call from the AP 200 as it is to the socket processing 202. This is performed by calling the corresponding function of the socket processing 202 as it is, similarly to the above case. Next, when there is issued a "sendto" call of a datagram transmission function, in which an IP address of a communication partner is designated, the address inquiry processing 400 of the address conversion processing 210 inquires of the AMS 102 about a present address of the communication partner. From a response to the inquiry, the present address corresponding to the home address of the communication partner is extracted, and the present address is made to be held in the address correspondence table 503 of the address correspondence information cache administration 401. The address replacing processing 402 of the address conversion processing 210 replaces the home address by the present address, and issues a "sendto" call to the socket processing. In a "recvfrom" call thereafter, the address replacing processing 402 of the address conversion processing 210 refers to the address correspondence table 503 to replace the home address of the socket interface function by the present address. Until the socket is closed by a "closesocket" call, the address replacing processing 402 of the address conversion processing 210 replaces the home address with the present address. Validity time is set in advance for information of each entry of the address correspondence table 503. An entry is deleted from the correspondence table 503, when its validity time expires. This deletion is performed by the address correspondence information cache administration 401. As for a present address corresponding to a home address which has been deleted from and is not registered in the address correspondence table 503, when a message is to be sent, the address inquiry processing 400 inquires of the AMS 102 again.

Alternatively, deletion of an entry of the address correspondence table 503 of the address correspondence information cache administration 401, may be performed not at the expiration of valid time but at the end of communication in the connection-less mode, namely, when a "closesocket" call is issued.

As described above, according to the present embodiment of the invention, a home address can be converted to a present address using socket hook processing. Accordingly, communication with a mobile computer moved to another network can be realized without changing a transit device such as existing routers and without changing existing APs. Further, existing equipment can be used effectively in a communication system.

In the above-described embodiment, correspondence between a home address and present address notified by the address notification message 511 is reflected in the address correspondence table 501. Next, a second embodiment will be described, in which an authentication function is provided to a message to improve reliability of information stored in the address correspondence table 501. In the following, functions added to the first embodiment to realize this will be mainly described.

Figure 8:
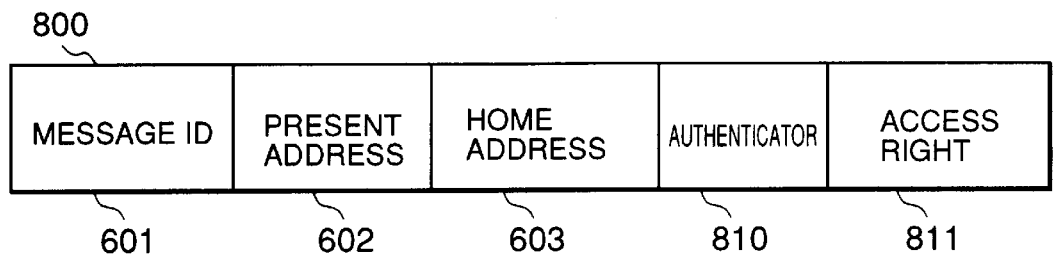
FIG. 8 is an explanatory view showing a protocol message format in a second embodiment of the invention.

FIG. 8 shows a format of a message used when an authentication function is added. In FIG. 8, a message ID field 601, a present address field 602 and a universal address (home address) field 603 are the same as respective ones in the above-described embodiment in their forms and uses. Added fields are an authenticator field 810 for storing a value used for authentication, and an access right field 811 for designating an access right described below.

Figure 9:
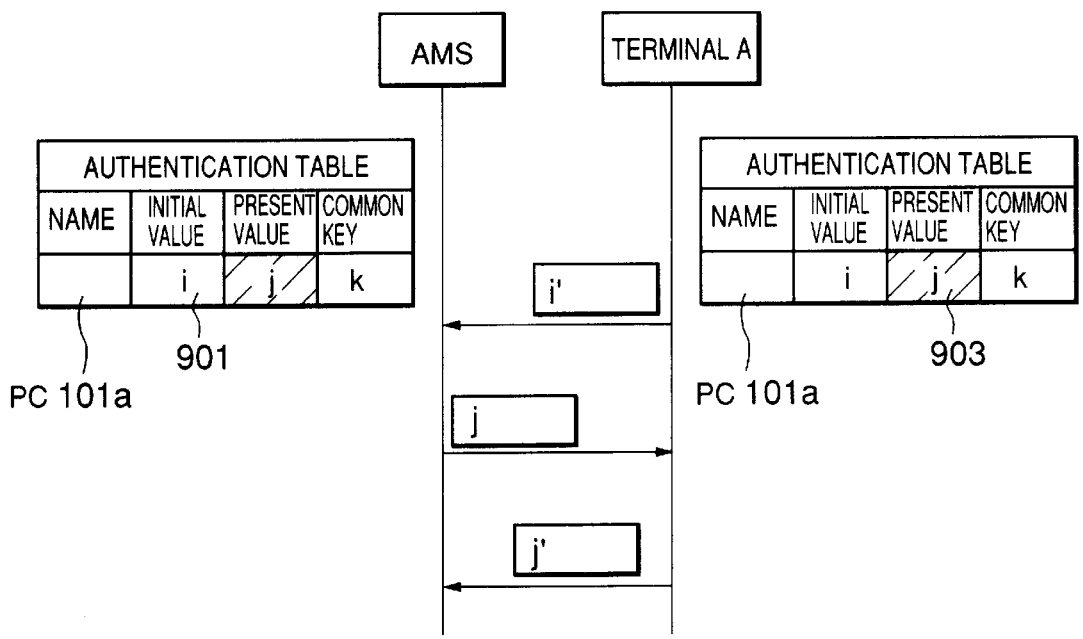
FIG. 9 is a sequence diagram of processing when an authentication function is added, according to the second embodiment of the invention.

A method of this authentication will be described giving an example of an address notification message. FIG. 9 shows a method for authenticating an address notification message. As shown in FIG. 9, a PC 101 and an AMS 102 are provided with common authentication tables 901 and 903, respectively. In each of the authentication tables 901 and 903, there are set a name PC 101a as an identifier to identify the PC 101a, an initial value i for first encryption, and an encryption key K, in advance. As a present value j used for second encryption and thereafter, a random value is set by the AMS 102 when a message is judged as valid, as described below.

In FIG. 9, when the authenticator field 810 is used, the initial value i of the authenticator is set in the PC 101 and AMS 102 in advance by the network administrator, together with the encryption key K. This initial value i is encrypted to obtain a value i', which, then, is used as an authenticator.

When the address notification processing 205 shown in FIG. 2 makes an address notification message 511, it encrypts the initial value i using the encryption key K using a predetermined encryption method, stores the encrypted value i' into the authenticator field 810 shown in FIG. 8, and sends the address notification message 511 onto the network. On the network, this authenticator flows as data encrypted by the encryption key common to the PC 101 and AMS 102. The address notification receiving processing 301 of the AMS 102 decrypts the authenticator i' using the common encryption key K to decode it. When the decrypted result accords with the initial value i set in the authentication table 901, that message is judged as a valid one sent from the PC 101a: if not, as non-valid. When judged as non-valid, that message is discarded. When judged as a valid message, the present address is added to a position corresponding to the home address in the address correspondence table 501 shown in FIG. 5. The authenticator field 810 is used also in the address completion message 512, a response to the address notification message 511. Here, the address notification receiving processing 301 decides a present value j used for second encryption and thereafter, by extracting a random value, and stores the decided present value j as the present value of the authentication table 901 shown in FIG. 9. Further, the address notification receiving processing 301 encrypts the present value j using the encryption key K by a predetermined encryption method, sets the encrypted value j' in the authenticator field 810 shown in FIG. 8, and sends the address completion message 512 onto the network. In the PC 101, the value j' stored in the authenticator field 810 of the address completion message 512 is decrypted using the common encryption key K for decoding. The present value j as the decrypted result is stored in the present value of the authentication table 903 shown in FIG. 9, and, in the following authentication, the present value j is used instead of the initial value i, for authentication. Further, a combination of the initial value i and the home address of the PC 101 may be used as an authenticator. Of course, the method of combination is the same in both the PC 101 and AMS 102.

Also in the address inquiry message 513, the authenticator field 810 can be used. The method of use may be similar to the address notification message 511. As in the address registration response message (address completion message) 512, a random number may be set in the inquiry response message 514 as an authenticator, to be used for the next authentication and thereafter.

Thus, by providing the authentication mechanism to the registration of information of a newly-assigned address, unauthorized accesses can be excluded and the security of the system can be improved.

Next, a method of using the access right field will be described. This access right is utilized for limiting terminals to which a present address of a mobile terminal after movement is notified. It is used for a user of a mobile terminal to limit senders of messages received by his terminal, for example, when he wishes to receive only important messages from particular terminals when a network at the destination of his business trip is of limited bandwidth. Further, if a user wishes to avoid interruption of his present work due to receiving a message, he can receive only messages from particular terminals.

Figures 10, 11:
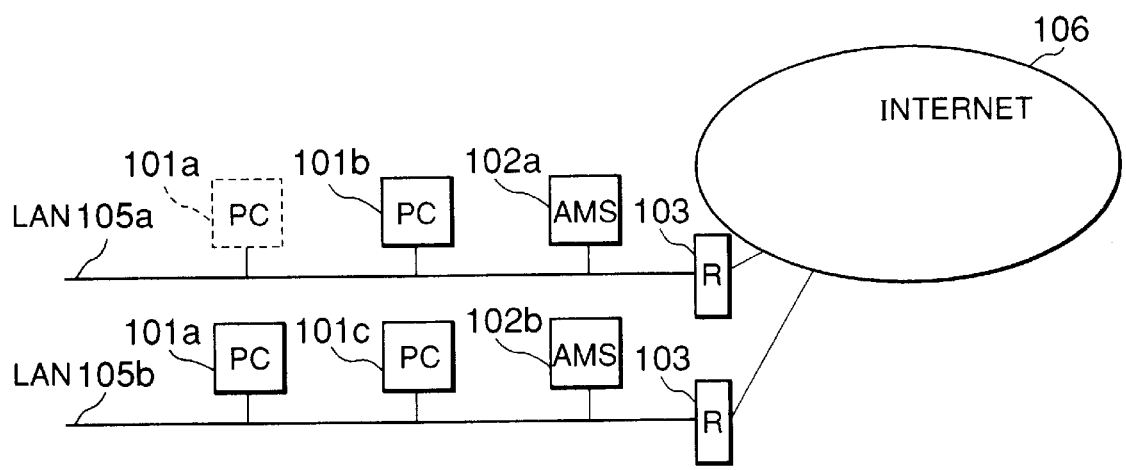
FIG. 10 is a view explaining an access right management table according to the second embodiment of the invention.
FIG. 11 is a schematic diagram showing a network system according to a third embodiment of the invention.

In this case, for the AMS 102 to administrate terminals to which a present address of a mobile terminal after its movement can be notified, the AMS 102 is provided with an access right administration table 1010 as shown in FIG. 10. The access right administration table 1010 stores, for each home address (or present address) of a moved terminal, home addresses (or present addresses) of terminals to which the present address after movement can be notified. The access right administration table 1010 is set by the address notification message 511 from the moved PC 101. In this case, the access right field 811 shown in FIG. 8 is used. The access right field 811 is made to be a variable length field, and stores the length of the access right field 811 and home address(es) to which a present address can be notified. For example, the access right may be set so that only terminals with which a user has had communication are notified of the present address, or so that only particular PCs 101 with greater urgencies are notified of the present address. Further, instead of designating home addresses to which a present address can be notified, there may be designated a network or networks to which a present address can be notified. In this case, a present address of a mobile terminal is notified to the PCs 101 which have home addresses in the designated network(s). In that case, a network is designated by writing a network identifier of its IP address in the access right field 811, while putting "0" as a host identifier. For example, when it is wished to make responses only to inquiries from the PCs 101 whose home network is the one to which the moved terminal was connected before the movement, the network identifier of that home network and the host identifier "0" are described in the access right field 811. Further, if it is also allowed that the PCs 101 belonging to the network to which the terminal in question has moved, receive responses to their inquiries, the network identifier of that network, i.e. the destination network of the movement, also is described successively in the access right field 811.

The address notification receiving processing 301 of the AMS 102 receives an address notification message 511, and when the address right field 811 is set in the message, it extracts an IP address or addresses described in the access right field 811. The extracted IP address or addresses are stored in an area of the address right administration table 1010, having, as the address of a mobile terminal corresponding to that area, the home address described in the home address field 603 of the address notification message 511. When the access right field 811 does not exist in the address notification message 511, inquiries from all the PCs 101 are responded with the present address, as a default condition.

In the address inquiry response processing 303, when there arises an inquiry from another PC 101 about the present address of the moved terminal, the address right administration table 1010 is referred to. When the IP address of the PC 101 which has made the inquiry exists among the addresses stored in the table 1010 as corresponding to the address of the moved terminal and as allowed to receive notification, the PC 101 is judged to be allowed to receive notification, and the present address of the moved terminal is notified to that PC 101. When the IP address of the PC 101 which has made the inquiry is not stored in the address right administration table 1010 as allowable, the PC 101 is judged not to be allowed to receive notification, and the present address of the moved terminal is not notified to that PC 101.

The address right field 811 is not used except in the address notification message.

As described above, using the access right field 811, it is possible to provide a function of limiting PCs 101 to which the present address after movement is notified. By this, it is possible to limit senders of messages received by a user of a mobile terminal, and to block an unnecessary request for communication from another computer.

In the above-described first and second embodiments, it is assumed that one AMS 102 is provided for a network system. However, a plurality of AMSs 102 may be provided for an inter-network system, by distributing the AMSs 102 to respective networks depending on the scales of the networks or on the administration unit. An embodiment in this case will be described as the third embodiment in the following.

First, referring to FIG. 11, there will be described an example in which one AMS 102 is provided for each network of the Internet. FIG. 11 shows a configuration of a network system in the third embodiment of the invention. In the third embodiment, a plurality of AMSs 102 are provided, and therefore, terminals belonging to each network as a home network are administered by an AMS 102 provided for that network.

In this case, a method of assigning an IP address by an AMS 102 is decided in advance. For example, in FIG. 11, it is assumed that an IP address of a PC 101n connected to the LAN 105a is expressed by "x.x.x.n". Here, the network identifier of the LAN 105a is "x.x.x" and a host identifier is "n". When one AMS 102 is provided within that network, the host identifier of the IP address of the AMS 102 is prescribed as a given value, for example "254". Thus, the IP address of the AMS 102 connected to the LAN 105a is set as "x.x.x.254". By this, when each PC 101 issues the address inquiry message 513 or address notification message 511, that PC 101 can make the address of the destination AMS 102. For example, it is assumed that the home network of the PC 101a is the LAN 105a, and, when the PC 101a moves to the LAN 105b, the AMS 102 connected to the LAN 105a as the home network of the PC 101a administrates the present address of that PC 101a. In this case, the home address of the PC 101a is expressed by "x.x.x.a", and, when the PC 101a issues an address notification message 511, it can issue it by setting "x.x.x.254" as the address of the destination AMS 102. In the address inquiry processing 400 also, an address inquiry message 513 can be issued to an address similar to the above-described one.

Figure 12:
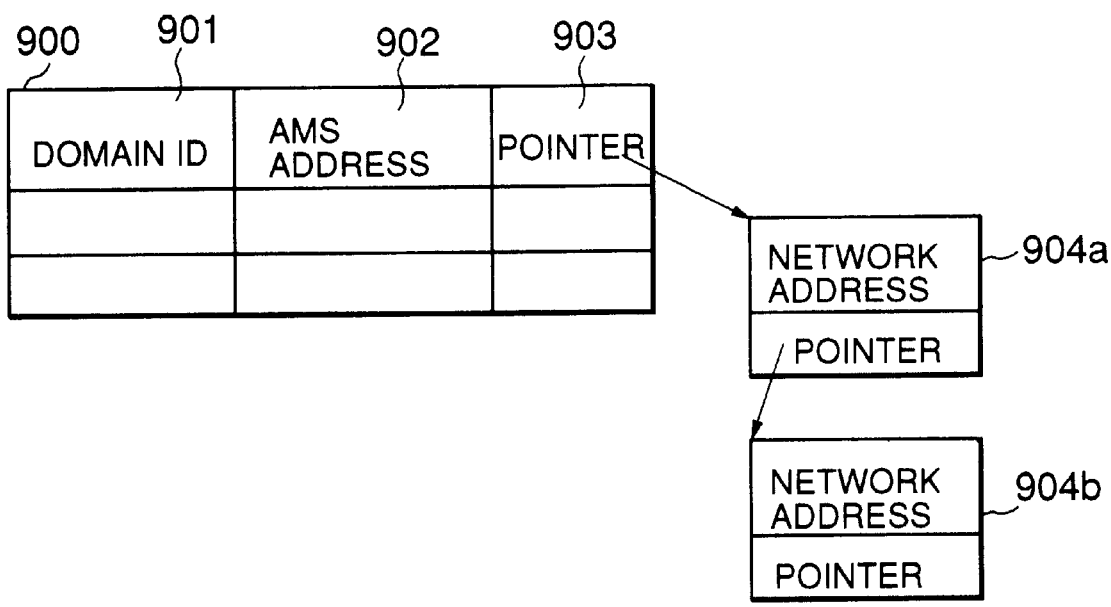
FIG. 12 is a view explaining a correspondence table 900 between network addresses and AMS addresses, in the third embodiment of the invention.

Next, there will be described an example in which one AMS 102 is provided for a plurality of networks. This corresponds to a case in which one AMS 102 is provided for each domain which administrates a plurality of networks. In this example, referring to FIG. 12, there will be described a method of obtaining an address of an AMS 102 which holds a present address of a PC 101, from a home address assigned to that PC 101. In FIG. 12, the reference numeral 900 shows an AMS address table for storing AMS addresses, being provided for each PC 101. The AMS address table 900 holds AMS addresses for respective domains, and holds network identifiers administered by each AMS. The AMS address table 900 contains a domain ID 901 as an administration unit, an AMS address 902 of an AMS existing in that domain, a pointer 903 to network identifiers of networks constituting that domain, and pluralities of network address tables 904a and 904b pointed to by the pointer 903. The network address tables 904a and 904b are connected in a chain by pointers, and the AMS address 902 can be searched from these network addresses in the network address tables 904a and 904b. As a value for an AMS address 902, any value may be set conveniently for a domain in question, differently from the above example in which a given value is set. When each PC 101 issues an address inquiry message 513 or address notification message 511, it obtains a network identifier of another PC 101 of a communication partner from the home address of that partner, and searches the AMS address table 900 for an AMS address corresponding to that network identifier. Then, the address inquiry message 513 or address notification message 511 can be issued toward thus-searched AMS addresses.

Alternatively, instead of providing an AMS address table for each PC 101, an AMS address table may be registered in an administration device for name service, directory service, or the like, so that each PC 101 accesses that administration device to search for an AMS address.

According to the third embodiment, AMSs 102 can be distributed to networks depending on the scales of the networks or on the administration unit of the networks.

As described above, according to the present invention, when a communication protocol address should be changed dynamically due to movement of a computer, or the like, in a communication system, it is possible to realize communication without changing a network transit device such as an existing router, and without having various influences of change of the communication protocol address on an existing application. Further, when a communication protocol address should be changed dynamically due to movement of a computer, or the like, in a communication system, it is possible to realize communication by effectively utilizing existing equipment.

What is claimed is:

1. A mobile computer supporting system comprising:
    a first terminal which belongs to a first network as its home network;
    a second terminal which belongs to a second network as its home network; and
    an administration server provided with a storing means for storing a home address and a present address so as to correspond to each other, for each terminal, said home address being assigned when the terminal is connected to said home network and said present address being assigned when the terminal is connected to another network different from said home network;
    said first terminal comprising:
        notification means for notifying said administration server of said present address together with the home address of said first terminal, when said present address is assigned to said first terminal;
    said second terminal comprising:
        a protocol processing means for performing processing in accordance with a predetermined protocol when sending and receiving information to and from said second network;
        an application program for sending and receiving information to and from said first terminal through said protocol processing means;
        an acquiring means for acquiring information if the home address of said first terminal is added to said information, when said application program sends said information to said protocol processing means so that said information is sent to said first terminal through said protocol processing means;
        an inquiry means for inquiring said administration server about the present address of said first terminal by using the home address of said first terminal, added to the acquired information acquired by said acquiring means, and for receiving a response on the present address of said first terminal from said administration server; and
        a conversion means for converting the home address of said first terminal, added to the acquired information acquired by said acquiring means, to the present address of said first terminal, received by said inquiry means;
        said acquiring means sending said acquired information, having the present address converted from the home address by said conversion means, to said protocol processing means; and
    said administration server comprising:
        a registration means for registering said present address in a present address storing area of said storing means corresponding to the home address of said first terminal, when notified of said present address by said notification means; and
        a response means for sending the present address of said first terminal, which is stored in said storing means and corresponds to the home address of said first terminal, for responding to said inquiry means, when inquired by said inquiry means about the present address of said first terminal.

2. The mobile computer supporting system according to claim 1, wherein:
    said second terminal further comprises a holding means for holding the present address of said first terminal, received by said inquiry means, in correspondence relation to the home address of said first terminal; and
    said conversion means refers to said holding means to convert the home address of said first terminal, added to the acquired information acquired by said acquiring means, to the present address of said first terminal.

3. The mobile computer supporting system according to claim 1, wherein: when the home address of said first terminal is not added to said acquired information, said acquiring means sends said acquired information as it is to said protocol processing means.

4. The mobile computer supporting system according to claim 1, wherein:

said notification means encrypts a predetermined authenticator by means of a predetermined encryption key, and adds said encrypted authenticator to perform said notification to said administration server; and said registration means performs predetermined decryption of said encrypted authenticator by means of said predetermined encryption key, when there arises said notification added with said encrypted authenticator by said notification means, and performs said registration, judging said notification as a valid notification, when the decrypted authenticator accords with said predetermined authenticator.

5. The mobile computer supporting system according to claim 1, wherein:

said information means further notifies said response means of said administration server, of terminals which are allowed to receive a response to a inquiry about the present address of said first terminal when said inquiry is made by said inquiry means; and said response means responds to an inquiry about the present address of said first terminal when said inquiry is made by said inquiry means of said terminals which are allowed to receive a response.

6. The mobile computer supporting system according to claim 1, wherein: said administration server is provided for each of said first network and said second network.

7. The mobile computer supporting system according to claim 1, wherein: said administration server is provided for each domain which is provided with a plurality of networks and which administrates said plurality of networks.

8. A terminal connected to an administration server which administrates a home address and a present address for each of a plurality of terminals, said home address being assigned when first connected to a network, said present address being assigned when connected to another network different from said network to which said each is first connected, and said connection to the administration server being made through said network; comprising:

notification means for notifying said administration server of said present address together with the home address of said terminal, when said present address is assigned to said terminal;

a protocol processing means for performing processing in accordance with a predetermined protocol when sending and receiving information to and from said network;

an application program for sending and receiving information to and from another terminal through said protocol processing means;

an acquiring means for acquiring information if the home address of said another terminal is added to said information, when said application program sends said information to said protocol processing means so that said information is sent to said another terminal through said protocol processing means;

an inquiry means for inquiring said administration server about the present address of said another terminal by using the home address of said another terminal, added to the acquired information acquired by said acquiring means, and for receiving a response on the present address of said another terminal from said administration server; and a conversion means for converting the home address of said another terminal, added to the acquired information acquired by said acquiring means, to the present address of said another terminal, received by said inquiry means; and said acquiring means sending said acquired information, having the present address converted from the home address by said conversion means, to said protocol processing means.

* * * * *